United States Patent [19]

Lahalih et al.

[11] Patent Number: 4,820,766

[45] Date of Patent: * Apr. 11, 1989

[54] HIGHLY STABLE SULFONATED MELAMINE-FORMALDEHYDE CONDENSATE SOLUTION

[76] Inventors: Shawqui Lahalih; Ma'mun Absi-Halabi, both of P.O. Box 24885, Safat, Kuwait

[ * ] Notice: The portion of the term of this patent subsequent to Jun. 30, 2004 has been disclaimed.

[21] Appl. No.: 13,734

[22] Filed: Feb. 12, 1987

Related U.S. Application Data

[63] Continuation-in-part of Ser. No. 788,133, Oct. 16, 1985, Pat. No. 4,677,159.

[51] Int. Cl.$^4$ .............................................. C08G 12/30
[52] U.S. Cl. ....................................... 524/843; 524/6; 524/598; 524/650; 528/254; 528/256
[58] Field of Search ............................ 524/6, 598, 843; 528/254, 258, 256

[56] References Cited

U.S. PATENT DOCUMENTS

| | | | |
|---|---|---|---|
| 3,827,992 | 8/1974 | Aignesberger | 524/6 |
| 3,870,671 | 3/1975 | Aignesberger | 528/254 |
| 3,941,734 | 3/1976 | Aignesberger | 528/254 |
| 3,985,696 | 10/1976 | Aignesberger | 528/254 |
| 4,316,826 | 2/1982 | Laquerbe | 524/598 |
| 4,430,469 | 2/1984 | Burge | 528/254 |
| 4,444,945 | 4/1984 | Sheldrick | 524/843 |
| 4,677,159 | 1/1987 | Lahalih | 524/6 |

Primary Examiner—C. Warren Ivy

[57] ABSTRACT

A highly stable melamine-formaldehyde condensate solution for use as superplasticizer additives for cement or the like is produced by condensing melamine and formaldehyde in an aqueous medium, sulfonating the melamine-formaldehyde condensate, further condensing and stabilizing the aqueous sulfonated melamine-formaldehyde condensate solution.

13 Claims, No Drawings

HIGHLY STABLE SULFONATED MELAMINE-FORMALDEHYDE CONDENSATE SOLUTION

BACKGROUND OF THE INVENTION

This application is a continuation-in-part of our U.S. patent application Ser. No. 788,133 which was filed on October 16, 1985 and now U.S. Pat. No. 4,677,159.

The invention relates to a stable water solution of sulfonated melamine-formaldehyde and melamine-urea-formaldehyde condensates for use as superplasticizer additives for mixtures containing inorganic settable cementitious materials, such as Portland cement, magnesia cements, gypsum and the like.

Cementitious materials, such as Portland cement, magnesia cement, gypsum and the like can be dispersed in water to form a settable paste. These materials can be used alone or they can be used in combination with solid fillers, such as sand, stone or the like, which impart significantly improved physical properties to the ultimately set or hardened structures formed therefrom. The mechanism that is responsible for the setting or hardening of the cementitious material is the hydration thereof. Accordingly, it is evident that the water that is mixed with the cementitious and filler serves not only as a means for dispersing the cementitious material and filler so as to impart workability or flowability to the resulting paste, but as the source of the water of hydration for the setting reactions.

The art relating to cementitious materials and concrete is highly developed. As a result, it is well known that, in theory, a water/cement ratio of about 0.27 is adequate for the hydration of cement. It is also well known that any water in excess of that amount that is used in a cementitious mix or concrete to impart increased workability will detract from the potential compressive strength that can be achieved. For instance, the correct selection of cement, aggregate and curing conditions can yield concrete having a compressive strength of 960 kg/cm$^2$ and a flexural strength greater than 110 kg/cm$^2$. However, most common concrete placing practices demand a level of workability which cannot normally be obtained without the addition of some, and often considerable water above the theoretical requirement, thereby limiting the physical characteristics of the resulting concrete.

In the past, some improvement in the workability of cementitious pastes and concretes has been achieved by the addition thereto of small amounts of anionic plasticizers such as unmodified lignosulfonates and polyhydroxycarboxylic acids. These anionic plasticizers are believed to be absorbed onto the solid particles of the cementitious material and aggregate, thereby causing them to become mutually repulsive and more readily dispersible in water.

Relatively recently, these anionic plasticizers have been replaced with a variety of materials that have exhibited far superior properties in terms of their ability to aid in the dispersing of the cementitious materials and aggregate. In general, these newer plasticizers, which are referred to as superplasticizers, impart extreme workability to the cementitious paste that is formed and, in addition, allow for the use of considerably less water than do the normal plasticizers (often as much as a 30% or more water reduction for comparable workability).

Among the currently available superplasticizers there may be included resinous materials such as sulfonated melamine-formaldehyde condensates, and modified lignosulfonates. Within each of these known types of superplasticizers variations occur; for example, chemically similar materials may have different molecular weights, a different pH, and so on, which alter their effectiveness, stability and overall usefulness.

One such superplasticizer is disclosed in U.S. Pat. No. 4,444,945 to Sheldrick. In that patent, it is taught to produce a sulfonated melamine-formaldehyde condensation product in two stages. In the first stage, melamine, formaldehyde and a bisulfite are condensed in an aqueous solution at a pH of 8–10 for 1–5 hours. In the second stage, condensation is continued at a pH of 6–7 for 2–6 hours.

Another superplasticizer is disclosed in U.S. Pat. No. 4,272,430 to Pieh et al. However, in accordance with that patent, the superplasticizer is a copolymer of melamine-urea-formaldehyde and an aromatic aminosulfonic acid.

The preparation of sulfonated melamine-formaldehyde resins is also disclosed in U.S. Pat. Nos. 3,985,696, 3,941,734, 3,870,671 and 3,661,829 to Aignesberger et al. In accordance with the first of these patents, the preparation involves a three-stage process. The initial stage comprises condensing melamine or a mixture of melamine and urea with formaldehyde and an alkali metal sulfite in an aqueous solution at 60°–80° C. and a pH of 10–13. In a second stage, the condensation is continued at a pH of 3–4.5; and in a third stage, the temperature is adjusted to 70°–95° C. and the pH is adjusted to 7.5–9 until a sample of the solution, when diluted to 20% solids, has a viscosity of 5–40 centipoises at 20° C.

In the second of these four Aignesberger et al patents, an initial condensation of an aqueous solution of melamine and formaldehyde preferably is conducted at a pH of 3.5–5, and at a temperature of 75°–85° C. for 20–100 minutes prior to cooling and the addition of an alkali metal sulfite to the reaction medium. After the sulfite is added, the condensation mixture is adjusted to a pH above 7, e.g., between 8 and 11, and refluxed for 1–3 hours. A similar preparation is disclosed in the third and fourth Aignesberger et al patents.

Other patents which relate to the preparation of sulfonated melamine-formaldehyde condensates in multiple stages include U.S. Pat. No. 2,730,516 to Suen et al and U.S. Pat. No. 2,407,599 to Auten et al. In accordance with the Suen et al patent, it is critical that the pH of the reaction mixture be within the range of from about 1.5 to 3.7 during the polymerization of the reactants so that the resulting products have the desired properties. Among the properties that are disclosed is a minimum viscosity of 50 centipoises at 20% solids content at 25° C.

The Auten et al patent also discloses the use of a relatively low pH in the initial condensation step, i.e., from about 7–10 for melamine-formaldehyde condensates and from about 4–10 for melamine-urea-formaldehyde. The temperature during the first stage condensation is from about 60°–105° C.

While many of the sulfonated melamine-formaldehyde and sulfonated melamine-urea-formaldehyde resin solutions produced in accordance with the known processes exhibit superplasticizing properties, they generally exhibit poor stability, particularly when they are to be used in concrete mixtures in areas characterized by sever climatic conditions, such as those in the Arabian Gulf. In addition, many of the prior art sulfonated superplasticizer resin solutions contain salt impurities, such as sulfates, which, if left in the resin solutions, can have undesirable effects when the superplasticizers are added to cementitious materials. For example, it is well known the salts of various kinds can alter the hydration reaction of Portland cement even when present in low concentrations, thereby harming the mechanical properties of concrete structures formed therefrom.

Still further, the known processes for preparing the sulfonated melamine-formaldehyde and melamine-urea-formaldehyde resin solutions require long cycle times, thereby adversely affecting the economics of the resin solutions so produced.

SUMMARY OF THE INVENTION

Surprisingly, we have discovered a sulfonated melamineformaldehyde or sulfonated melamine-urea-formaldehyde resin solution which is produced by a four stage process is free from the above and other disadvantages. The condensation products of the invention have an average molecular weight ranging from 850,000 to 1,000,000 and a molecular weight distribution of about 10 to 12. In addition, the products are stable, have a long shelf life, and can improve the workability of aqueous cement pastes which solidify to form concrete. The resin solutions of the present invention may be added to a mixture of water, cementitious material and inert solid filler or aggregate in an amount ranging from about 0.02 to about 2.0, and preferably from about 0.1 to about 1.0%, based on the weight of the solids of the sulfonated resin and the weight of the cementitious material, thereby to increase the slump of the paste, to decrease the amount of water needed for the paste, and to improve the mechanical properties of the resulting solidified and cured concrete.

DETAILED DESCRIPTION

In accordance with the present invention, highly stable, water soluble sulfonated melamine-formaldehyde and sulfonated melamine-urea-formaldehyde resin solutions are prepared in four distinctive stages.

In this first stage, melamine or a mixture of melamine and urea is reacted with formaldehyde in an aqueous medium at a reaction temperature of from about 45° to about 55° C. in the case of melamine, and at a reaction temperature of from about 60° to 85° C. in the case of melamine and urea mixtures. In either case, the ratio of formaldehyde to the amino groups present in the reaction medium is from about 1:1 to about 1.33:1, and the pH of the reaction medium is from about 10 to about 13, and preferably from about 10.5 to about 11.5. The pH of the reaction medium preferably is adjusted by the addition of an alkali metal hydroxide, such as sodium hydroxide. The initial condensation reaction is carried out for a period of from about 15 to about 30 minutes after the reactants have been mixed and the resulting solution has become clear.

The second stage, which is carried out without any prior pH adjustment, involves the addition of a sulfonating agent to reaction medium containing the initial melamine-formaldehyde or melamine-urea-formaldehyde condensate. The various known sulfonating agents are employed such as, for example, sulfurous acid, sulfonic acid, and the salts of sulfurous acid which yield bisulfite or sulfite ions under the reaction conditions. Normally, however, sulfite salts such as sodium metabisulfite, are the preferred sulfonating agents. The sufonation step is carried out by adding the sulfonating agent and then heating the reaction mass, without any pH adjustment, up to a temperature in the range of from about 70° to about 90° C., and preferably from about 75° to about 85° C., for a period of from about 30 to about 180 minutes. A reaction time of from about 45 to about 75 minutes is preferred. The amount of sulfonating agent that is added is such that the ratio of sulfite ions to melamine in the reaction mass is from about 0.8:1 to about 1.2:1.

The third stage is begun following the completion of the sulfonation by lowering the temperature of the reaction mass to about 40°–60° C., and preferably to about 45°–55° C. The pH of the reaction mass is then adjusted to about 2.5–4.0, and preferably to about 3.0–3.5, by the addition of an inorganic acid, such as sulfuric acid. Condensation under these conditions is continued for a period of from about 5 to about 150 minutes, preferably for about 10 to 20 minutes. The condensation is then stopped, prior to gelation, by raising the pH of the reaction mass to about 6.5–9.0, preferably to about 7.0–8.0. The pH may be raised by the addition to the reaction mass of a basic hydroxide or oxide such as a sodium hydroxide solution, a calcium oxide slurry or the like. The use of a calcium-containing hydroxide or oxide is preferred if the reaction mass contains sulfate ions which are to be removed from the final solution, since the calcium in the basic hydroxide or oxide will react with the sulfate ions to form a precipitate which can be removed from the resin solution, for example, by filtration at any convenient point in the process.

The fourth and final distinctive stage of the present process involves the stabilization of the sulfonated resin solution by heating the same to a temperature on the order of about 70° to about 100° C. for a period of from about 30 to about 180 minutes. It is preferred that the stabilization be carried out at temperatures in the range of about 80°–100° C. for a period of from about 60–120 minutes, whereafter the reaction mass is filtered, while hot, to remove all solids. The reaction mass is then cooled down to room temperature, and diluted to the desired solids content by the addition of water. The final pH of the sulfonated resin solution is adjusted to about 8.0–11.0, preferably about 8.5–9.5, and its viscosity is measured at 20° C. using a rotational viscometer.

The concentration of the total reactants added during the four stage procedure, based on the total weight of the reactants and water in the reaction mixture, may vary over wide limits. However, reactant concentrations in the range of between about 15% and about 60%, and preferably between about 20% and 50%, have been found to be the most beneficial. The concentration of the reactants drastically affects the low pH condensation time in the third step of the procedure where gelation time decreases as the concentration increases. The stability of the resin solutions prepared in accordance with the present process is substantially unaffected by the total concentration of the reactants within the above limits.

The presence or absence of urea in the reaction medium influences the reaction conditions in the various stages. For example, the preferred pH of the first and second stages is lower when both melamine and urea are present than when only melamine is being condensed with the formaldehyde. Also, the reaction temperature on the first stage, and preferably also in the third stage, is higher in the case where both urea and melamine are reacted with formaldehyde, and the low pH condensation time in the third stage is shorter in the case where both urea and melamine are present. The amount of urea that may be added to the reaction medium may vary from 0% up to about 60% by weight, based on the total weight of urea and melamine.

The present sulfonated melamine-formaldehyde and sulfonated melamine-urea-formaldehyde solutions may be used most beneficially as additives to cement, mortar and concrete, both pourable or flowable concrete and water-reduced high-strength concrete. However, the present solutions also can be added to other inorganic settable building materials which are based on gypsum, magnesia cement, alumina cement or the like as the binder.

The following Examples are further illustrative of the highly stable sulfonated melamine-formaldehyde solution according to the present invention and of the use of the aqueous solutions prepared thereby.

EXAMPLE 1

In the first stage of a four stage procedure, a formalin solution was prepared by dissolving 50.34 g of 94.6% paraformaldehyde in 230 ml of water. The pH of the mixture was raised by the addition of 0.5 ml of a 10N NaOH solution and the mixture was heated at 50° C. for 30 minutes. After the solution became clear, 88 ml of water were added and the solution was heated at 50° C. for an additional 15 minutes. The pH of the solution was then raised to 11.35 by the addition of 10N NaOH and 50 g of melamine. (The ratio of formaldehyde to amino groups was 1.33:1.) Upon addition of the melamine, it was noted that the temperature of the reaction mixture increased by about 4 to 5° C., then dropped back gradually to 50° C. within 15 minutes, during which time the melamine dissolved completely by reacting with formaldehyde.

Sodium metabisulfite (37.7 g) and water (20 ml) were then added to the solution to start the second stage of the procedure, thereby causing an increase in temperature of 4° to 5° C. while the sulfite salt was dissolving. The resulting solution was kept at around 50° C. for 5 minutes, whereafter the temperature was raised to 80° C. over a 15 minute period and kept at that temperature for an additional 45 minutes while maintaining the same pH.

The third stage was begun by cooling the solution rapidly (in approximately 5 minutes) to 50° C., whereafter 12 ml of 14.5N $H_2SO_4$ were added to it causing a drop in pH to 3.50 and an increase in temperature of 4-5° C. The temperature dropped gradually back to 50° C. within 15 minutes, and the solution was kept under these conditions with continuous stirring for an additional 95 minutes during which time it became viscous. The pH of the solution was then adjusted to about 7 by the careful addition of a slurry of calcium oxide (CaO) in water. The amount of CaO needed was approximately 8.0 g.

In the fourth and final stage of the procedure, after neutralization, the solution was heated to 80° C. in about 20 minutes and kept there for 60 minutes with continuous stirring. The solution was finally filtered to remove calcium sulfate and other solid particulates, cooled to room temperature, and treated with sodium hydroxide to adjust its final pH to 9.3.

The solution had a solids content of approximately 23% determined by total water evaporation at 60° C. The solids content was adjusted to 20% by addition of water and the final viscosity of the solution at 20° C. was 4.42 cp.

EXAMPLE 2

Another sulfonated melamine-formaldehyde resin solution was prepared following the same procedure outlined in Example 1, except that in the fourth stage, i.e., after the neutralization with the slurry of CaO, the temperature was raised to 100° C. instead of 80° C., and the pH of the final solution was adjusted to 8.11 instead of 9.3. All of the other conditions and variables were the same as in Example 1. The resulting solution had a solids content of 25% determined by total water evaporation at 60° C. The solids content was adjusted to 20% by addition of water and the final viscosity of the solution at 20° C. was 3.56 cp.

EXAMPLE 3

A formalin solution was prepared by adding 100.68 g of 94.6% paraformaldehyde to 460 ml of water. The reaction mixture was heated at 50° C. for 30. minutes after its pH was raised by the addition of 1.0 ml of 10N NaOH solution. After the solution became clear, 280 ml of water were added and the solution was heated until the temperature stabilized at 50° C. The pH was raised to 11.35 and 133.4 g of melamine were added (formaldehyde to amino group ratio of 1:1). The reaction was continued for an additional 15 minutes, whereafter 100.5 g of sodium metabisulfite and 80 ml of water were added to the reaction mixture which was stirred for 5 minutes. The temperature of the reaction solution was raised to 80° C. and stirred continuously for 60 minutes. The solution temperature was then lowered to 50° C., the pH was lowered to 3.5 by the addition of 14.5N $H_2SO_4$, and the reaction was continued for 90 minutes. A slurry of CaO was then added to raise the pH to 7.0 and the temperature was raised to 80° C. where the reaction was continued for one hour. The solution was filtered, while hot, to remove solid precipitates, cooled to room temperature, and its pH was adjusted to 9.05. The solids content of the final solution was 25.9% and its viscosity after dilution to 20% solids content was 3.91 cp at 20° C.

EXAMPLE 4

A solution was prepared according to the procedure outlined in Example 1, except that the concentrations of the reactants were higher. A formalin solution was prepared by adding 100.68 g of 94.6% paraformaldehyde to 245 ml of water. The reaction mixture was heated at 50° C. for 30 minutes after its pH was raised by the addition of 1.0 ml of 10N NaOH solution. After the solution became clear, it was heated at 50° C. for 15 minutes, and then its pH was raised to 11.35 by the addition of 10N NaOH solution. Melamine (100 g) was then added to the formalin solution. After 15 minutes, 75.4 g of sodium metabisulfite were added to the reaction mixture, which had not yet become clear, and the reaction mixture was kept at 50° C. for 5 minutes. The reaction mixture was then heated up to 80° C. and stirred continuously at this temperature for 1 hour, during which time it became clear. The reaction solution was then cooled to 50° C. and its pH was adjusted to 3.5 by the addition of 14.5N of $H_2SO_4$. Stirring was continued for 13 minutes. A slurry of CaO was then added to adjust the pH to 7.0, and the solution was heated to 80° C., where it was kept with continuous agitation for 60 minutes. The reaction mixture was then filtered, while hot, to remove the solid material, cooled to room temperature, and treated with 10N NaOH to adjust its pH to 9.

The solution had a solids content of 40%. After adjusting the solids content to 20% by addition of water, the viscosity of the solution at 20° C. was 3.43 cp.

EXAMPLE 5

A solution was prepared by a three-step procedure according to that described in U.S. Pat. No. 3,985,696. Accordingly, a formalin solution was prepared by adding 63.4 g of 94.6% paraformaldehyde to 137 ml of water. The reaction mixture was heated at 50° C. for 30 minutes after its pH was raised by the addition of 0.7 ml of 10N NaOH solution. After the solution became clear, it was withdrawn outside the reaction flask and cooled to room temperature.

A quantity of 15 ml of the prepared solution was then mixed at room temperature with 56 g of sodium metabisulfite and 12 ml of 20% sodium hydroxide solution. The mixture was immediately dumped into the flask, which already had been heated to 75° C., and 70 g of melamine was added. After 15 minutes, the solution became clear, then it was held at 75° C. for 45 minutes. The solution was then cooled to 50° C. and adjusted to a pH of 3.8 by adding a mixture of 12 ml of concentrated (98%) sulfuric acid and 180 ml of water. The resulting adjusted solution was further held at 50° C. for 35 minutes after the addition of the sulfuric acid. About 56 ml of 20% sodium hydroxide solution was then added to increase the pH of the solution to 8.0 and the solution was thereafter held at 90° C. for one hour. The solution was then cooled to room temperature and treated with a dilute NaOH solution to adjust its pH to 8.5.

The resulting solution had a solids content of 35.5%. After adjusting the solids content to 20% by addition of water, the viscosity of the solution at 20° C. was 4.10 cp.

EXAMPLE 6

A second solution was prepared by the three-step procedure of Example 5 (the procedure according to that described in U.S. Pat. No. 3,985,696), except that the concentrations of the reactants were lower. Accordingly, a formalin solution was prepared by adding 63.4 g of 94.6% paraformaldehyde to 137 ml of water. The reaction mixture was heated at 50° C. for 30 minutes after its pH was raised by the addition of 0.7 ml of 10N NaOH solution. After the solution became clear, it was withdrawn outside the reaction flask and cooled to room temperature. The prepared solution (154 ml) was then mixed at room temperature with 56 g of sodium metabisulfite and 12 ml of 20% sodium hydroxide solution. The mixture was immediately dumped into the flask, which had been already heated to 75° C., and 70 g of melamine were added followed by 350 ml of water. After 15 minutes, the solution became clear. It was held at 75° C. for 45 minutes and then cooled to 50° C. and adjusted to pH 3.8 by adding a mixture of 12 ml of concentrated (98%) sulfuric acid and 180 ml of water. The resulting adjusted solution was further held at 50° C. for 115 minutes after the addition of sulfuric acid. About 56 ml of 20% sodium hydroxide solution then was added to increase the pH of the solution to 8.0, and the solution thereafter was held at 90° C. for one hour. The solution then was cooled to room temperature and treated with dilute NaOH solution to adjust its pH to 8.5.

The resulting solution had a solids content of 22.8%. After adjusting the solids content to 20% by addition of water, the viscosity of the solution at 20° C. was 2.8 cp.

EXAMPLE 7

A solution was prepared according to the procedure described in Example 1 of U.S. Pat. No. 4,444,945. Accordingly, a formalin solution was prepared by adding 63.4 g of 94.6% paraformaldehyde to 240 ml of water. The reaction mixture was heated to 50° C. for 30 minutes after its pH was raised by the addition of 0.7 ml of 10N NaOH solution. After the solution became clear, it was withdrawn outside of the reaction flask and cooled to room temperature. Then, it was added to a solution of 63.1 of sodium metabisulfite in 120 ml of water. The pH of the mixture was found to be 9.85. It was adjusted to 9.10 by dropwise addition of dilute sulfuric acid (1.5% by weight). The adjusted mixture was charged to a reaction flask which had been already set at 103° C. Immediately, 84 g of melamine were added. Upon heating, the batch became clear at about 80° C. and within 20 minutes of heating after being transferred to the flask, it reached 103° C. The batch was then refluxed for 3 hours. The reaction solution was then cooled to 75° C., and 130 ml of water were added followed by 182.5 g of dilute (1.5% by weight) sulfuric acid. The pH of the solution was found to be 6.9 and was adjusted to 6.1 with dilute sulfuric acid. The batch again was heated to atmospheric reflux at 102° C. for 4 hours. The solution then was cooled to room temperature and treated with dilute NaOH to adjust its pH to 8.7.

The resulting solution had a solids content of 4.4%. After adjusting the solids content to 20% by the addition of water, the viscosity of the solution at 20° C. was 3.11 cp.

EXAMPLE 8

A solution was prepared according to a procedure analogous to that of Example 2 of U.S. Pat. No. 4,444,945, except that the concentrations of the reactants were slightly lower. Accordingly, a formalin solution was prepared by adding 42.3 g of 94.65 paraformaldehde to 110 ml of water. The reaction mixture was heated at 60° C. for 20 minutes after the pH was raised by the addition of 0.4 ml of 10N NaOH solution. After the solution became clear, it was withdrawn outside the reaction flask and cooled to room temperature. Then it was added to a solution of 63.1 g of sodium metabisulfite in 30 ml of water. The pH of the mixture was found to be 8,97. It was adjusted to 9.1 by dropwise addition of 20% sodium hydroxide solution. The adjusted mixture was charged to the reaction flask which had been already set at 103° C. Immediately, 84 g of melamine were added. Within 20 minutes, the batch reached 103° C., and it took about one hour to become clear after the addition of melamine. The mixture was refluxed at 103° C. for 3 hours. The reaction solution then was cooled to 75° C. and 50 ml of water added, followed by 90 ml of dilute (1.5% by weight) sulfuric acid to bring the pH of the mixture down to 6.10. The batch again was heated to atmospheric relux at 102° C. for 4 hours. The solution then was cooled to room temperature and treated with dilute NaOH solution to adjust its pH to 8.6.

The resulting solution had a solids content of 36.7%. After adjusting the solids content to 20% by addition of water, the viscosity of the solution at 20° C. was 2.45 cp.

EXAMPLE 9

A solution was prepared according to the procedure outlined in Example 1, except that both urea and melamine were added to the reaction medium. A formalin solution was prepared by adding 67.11 gm of 94.6% paraformaldehyde to 306 ml of water. The reaction mixture was heated at 50° C. for 30 minutes after its pH was raised by the addition of 0.5 ml of 10N NaOH solution. After the solution became clear, 116 ml of water was added. The temperature of the solution then was raised to 80° C. and the pH thereof was raised to 10.5. Melamine (50.0gm) and urea (15.87 gm) were added to the solution. The reaction was continued for 15 minutes at 80° C. Sodium metabisulfite (62.83 gm) and 35 ml of water were added to the solution. The reaction was continued for an additional hour. The pH was lowered to 3 by the addition of 14.5N sulfuric acid while maintaining the reaction temperature at 80° C. The reaction continued for an additional 65 minutes. The pH of the solution was raised to 7 by the addition of a slurry of CaO in water. Heating of the reaction mixture continued at 80° C. for one hour. Continuous stirring was maintained throughout the four reaction steps.

The resulting solution had a solids content of 24%. The solids content of the solution was adjusted to 20% by addition of water and the final viscosity of the solution at 20° C. was 4.8 cp.

EXAMPLE 10

Samples of the solutions prepared in accordance with the above Examples were tested according to ASTM C143-78 to determine their effect on the flowability or workability of a control concrete mix having the following composition.

| Portland cement | | |
|---|---|---|
| type I: 395: | Water:Sand:10 mm aggregate:20 mm aggregate | |
| | 205:625:395:759 | |

The flowability of concrete is measured by standard tests such as ASTM C143-78, "Slump of Portland Cement Concrete". Generally speaking, according to ASTM C143-78, a concrete mix is placed, as soon as it is prepared, in a standard conically shaped container. The container is then removed, allowing the fresh concrete mix to flow, i.e., to collapse. The difference between the height of the mix before and after collapse is called "slump", and the higher the flowability of a concrete mix, the larger the value of its slump. The value of slump is usually given in millimeters (mm) or inches (in).

In testing the sample solutions, cement, sand and the aggregates were first mixed dry and then water was added with continuous mixing and finally the sample solution was added slowly. Results were obtained as follows:

TABLE 1

| Effect of the Prepared Solutions of Example 1 through 9 on the Slump of Concrete When 0.8% Dose of 20% Concentrated Solution was Added. (Initial slump of concrete control mix is 40 ± 5 mm.) | |
|---|---|
| Sample of Example No. | Slump (mm) |
| 1 | 150 |
| 2 | 140 |
| 3 | 140 |
| 4 | 140 |
| 5 | 95 |
| 6 | 100 |
| 7 | 125 |
| 8 | 105 |
| 9 | 100 |
| Melment L-10 (commercial)* | 95 |

*a product of Suddeutsch Kalkstickstoff-Werk. AG. of Trostberg, Germany. This product is a melamine based sulfonated resin.

As can be seen from Table 1, when a dose of 0.8% of the sample solutions is added to a control concrete mix, the slump of concrete mix increases appreciably in all cases. However, when using a solution having an undiluted solids content of 23%, a greater improvement in slump is achieved using a solution prepared in accordance with our invention (Example 1), as compared to a solution of equal solids content prepared in accordance with known processes (Examples 6 and 7). The same holds true for solutions having an undiluted solids content of 36%. Compare the more favorable results achieved with the solution of Example 4 over the results using the solutions of Examples 5 and 8.

EXAMPLE 11

Some of the solutions prepared in Examples 1 through 9 were tested for their improvement on the compressive strength of concrete. Test cubes were made from concrete mixes having a slump of 50±5 mm and conditioned according to ASTM C192-81. With the addition of sample solutions water had to be reduced to maintain a workable concrete of the same slump as that of the control. Table 2 shows the results on compressive strengths tested according to ASTM 39-80 after concrete was cured for 3, 7 and 28 days. The concrete mix used for these tests is the same as that of Example 10. The available sand is zone 3 and the gravel is single and 20 mm maximum size.

TABLE 2

| Effect of Various Samples on the Compressive Strength of Concrete when 3% dose (based on dry weight of cement) of 20% Concentrated Solution was Used. (Slump of concrete for all tests is 50 ± 5 mm.) | | | |
|---|---|---|---|
| | Compressive strength (kg/cm$^2$) | | |
| Sample of example | 3 days | 7 days | 28 days |
| Control | 179 | 281 | 362 |
| 1 | 403 | 533 | 660 |
| 4 | 375 | 506 | 627 |
| 5 | 358 | 498 | 593 |
| 6 | 364 | 482 | 600 |
| 7 | 378 | 488 | 627 |
| 8 | 335 | 471 | 588 |
| Commercial (Melment L-10) | 336 | 476 | 591 |

As can be seen from Table 2, although there is a significant improvement in compressive strength over that of the control mix regardless of which superplasticizer solution is added, the greatest improvements are achieved by using the solutions according to the present invention, i.e., those which were prepared in accordance with our process. For example, when a concrete mix was treated with a 3% sample of 20% solution which was prepared in accordance with our invention (Example 1), the compressive strength after 28 days was 660 kg/cm², compared to 600 kg/cm² (Example 6) and 627 kg/cm² (Example 7) for solutions prepared by prior art processes under similar reactant concentrations of 23%. Even more significantly, Table 2 illustrates that when diluted sample solutions that were prepared from the more concentrated undiluted solutions were used, the compressive strength achieved using our solution (Example 4) was 627 kg/cm², which is equal to or higher than the results obtained using the lower concentration samples prepared according to the prior art (Examples 6 and 7). In other words, the effect on improving the compressive strength of concrete when using a high concentration product, such as that of Example 4 of the present invention (concentration of reactants is 41%), was just as good if not better than when using those samples prepared at lower concentrations according to Examples 6 and 7, where the undiluted concentration of reactants was 23%. This is very significant because higher undiluted concentration of reactants means much less cycle time is needed for the preparation of the final product solutions which are diluted to a 20% solids content.

The vastly improved cycle times and resulting economic benefits associated with solutions made in accordance with our process can be appreciated by comparing the examples. Thus, to produce a 20% diluted product solution from a 23% undiluted sulfonated melamine-formaldehyde solution, our process (Example 1) required a 4 hour cycle time, whereas 8 to 9 hours was required when proceeding in accordance with the teachings of U.S. Pat. No. 4,444,945 (Example 7). For high undiluted concentrations, our process (Example 4) required a cycletime of only 2.5 hours, which translates into an effective cycle time to produce a 20% diluted solution of only about 1.25 hours.

EXAMPLE 12

The solutions prepared in Example 1 through 9 were tested for storage thermal stability. Accelerated thermal stability testing was carried out by storing the samples in the solution form in an air-circulated oven maintained at 60°±1° C. for two weeks. Daily measurement of viscosity and pH were recorded. The results are shown in Table 3.

TABLE 3

Viscosity and pH Drop of Thermally Accelerated Sample Solutions At Various Elapsed Times.

Stability of Viscosity and pH of Various Samples after Accelerated Aging at 60° C. for Two Weeks

| Sample of Example No. | Initial viscosity cp at 20° C. | Final viscosity cp at 20° C. | % Change in viscosity | Initial pH | Final pH | % drop in pH |
| --- | --- | --- | --- | --- | --- | --- |
| 1 | 4.42 | 3.47 | 21.5 | 9.3 | 7.65 | 17.7 |
| 2 | 3.56 | 3.32 | 6.7 | 8.11 | 7.43 | 8.3 |
| 3 | 3.91 | 3.20 | 18.2 | 9.05 | 8.10 | 10.5 |
| 4 | 3.41 | 2.65 | 22.2 | 9.36 | 7.65 | 18.2 |
| 6 | 4.10 | 2.90 | 29.3 | 9.76 | 8.20 | 16.0 |
| 7 | 3.11 | 3.00 | 3.5 | 8.65 | 7.68 | 20.5 |
| 8 | 7.10 | 4.93 | 30.6 | 9.79 | 7.78 | 20.5 |
| 9 | 4.80 | 4.03 | 16.0 | 10.56 | 8.0 | 24.2 |
| Melment L-10 | 4.50 | 2.60 | 42.2 | 9.20 | 8.39 | 8.8 |

The stable sulfonated melamine-formaldehyde condensation solution according to the present invention have molecular arrangements expressed in the molecular weight distribution and the distribution of the low and high molecular weight species which are responsible for the admixtures dispersion ability and their superplasticizing effectiveness. For example, it has been found that the solution according to the present invention have high relative average molecular weights ranging from about 850,000 to about 1,000,000 with broad molecular weight distribution of about 10-12 compared to samples prepared according to the prior art where the average molecular weights range from about 600,000 to about 700,000 and wherein the molecular weight distribution are narrower between 7-9. The relative average molecular weight determinations were carried out using Gel Permeation Chromatography (GPC) which is a standard method.

In addition, the solutions according to the present invention have minimal amounts of sulfate and suspension stability when stored at elevated temperatures.

What is claimed is:

1. A stable aqueous sulfonated melamine-formaldehyde condensate solution made in accordance with the following process which includes the steps of:
   (a) condensing melamine and formaldehyde in an aqueous reaction medium having a formaldehyde:amino group ratio of from about 1:1 to about 1.33:1 and a pH of from about 10 to about 13, said condensation being conducted at a temperature of from about 45° to about 55° C.;
   (b) sulfonating the melamine-formaldehyde condensate formed in step (a) by adding a sulfonating agent to the reaction medium obtained in step (a) and by heating said reaction medium to a temperature of from about 70° to about 90° C., said sulfonation being carried out at a pH of from about 10 to about 13;
   (c) further condensing the sulfonated melamine-formaldehyde condensate formed in step (b) by reducing the temperature of the reaction medium from step (b) to about 40°-60° C., adjusting the pH thereof to about 2.5-4.0, maintaining said temperature and pH conditions for a period of from about 5 to about 150 minutes, and stopping said further condensation prior to gelation of the further condensed sulfonated melamine-formaldehyde condensate by adjusting the pH of the reaction medium to about 6.5-9.0; and (d) stabilizing the aqueous sulfonated melamine-formaldehyde condensate solution formed in step (c) by heating the reaction mixture obtained in step (c) to a temperature of from about 70° to about 100° C. for a period of from about 30 to about 180 minutes 2. A stable aqueous sulfonated melamine-formaldehyde condensate solution according to claim 1 which said solution has an average molecular weight ranging from 850,000 to 1,000,000 and a molecular weight distribution of about 10 to 12.

3. A stable aqueous sulfonated melamine-formaldehyde condensate solution according to claim 2 wherein said sulfonating agent is an alkali metal sulfite or bisulfite, wherein the ratio of sulfite:melamine is from about 0.8:1 to about 1.2:1, and wherein the sulfonation reaction is carried out for a period of from about 30 to about 180 minutes.

4. A stable sulfonated melamine-formaldehyde condensate solution according to claim 3 wherein said condensing step (c) is stopped by adjusting the pH of the reaction medium with a calcium-containing hydroxide or oxide which will cause the precipitation of any sulfate ions present in said reaction medium.

5. A stable aqueous sulfonated melamine-formaldehyde condensate solution according to claim 1 wherein said condensation step (a) is carried out at a pH of from about 10.5 to about 11.5 for a period of from about 15 to about 30 minutes after the reactants have been mixed and the reaction medium has become clear; wherein sodium metabisulfite is used as the sulfonation agent in sulfonation step(b); and wherein the ratio of sulfite:melamine in step (b) is from about 0.8 to about 1.2:1.

6. A stable agueous sulfonated melamine-formaldehyde condensation solution according to claim 5 wherein the sulformation step (b) is carried out at a temperature of from about 75°–85° C. for about 45–75 minutes; wherein the condensation step (c) is carried out at a pH of from about 3.0–3.5 and at a temperature of from about 45°–55° C. for about 10 to about 20 minutes and subsequently adjusting the pH of the reaction medium to pH of from about 7.0–8.0; wherein the stabilization step (d) is carried out at a temperature of from about 80–100° C. for about 60 to 120 minutes and wherein the clear solution obtained in step (d) is filtered while hot, to remove all solids; and wherein the filtered solution is cooled to ambient temperature and dilute with water to a predetermined solid content.

7. A stable aqueous sulfonated melamine-formaldehyde solution according to claim 6 wherein the pH of the diluted solution is adjusted to about 8.0–11.0.

8. A stable aqueous sulfonated melamine-urea-formaldehyde condensate solution made in accordance with the following process which includes the step of:
(a) condensing a mixture of melamine and urea with formaldehyde in an aqueous reaction medium having a formaldehyde:amino group ratio of 1:1 to 1.33:1, said condensation being conducted at a pH of from about 10 to about 13 at a temperature of from about 60° to about 85° C.;
(b) sulfonating the melamine-urea-formaldehyde condensate formed in step (a) by adding a sulfonating agent to the reaction medium obtained in step (a) and by heating said reaction mixture to a temperature of from about 70° to about 90° C., said sulfonating agent being capable of yielding bisulfite ions or sulfite ions under the reaction conditions and being present in an amount sufficient to provide a sulfite:melamine ratio of from about 8:1 to about 1.2:1, said sulfonation being carried out at a pH of from about 10 to about 13;
(c) further condensing the sulfonated melamine-urea-formaldehyde condensate formed in step (b) by reducing the temperature of the reaction medium from step (b) to about 40°–60° C., adjusting the pH thereof to about 2.5–4.0, maintaining said temperature and pH conditions for a period of from about 5 to about 150 minutes, and stopping said further condensation prior to gelation of the further condensed sulfonated melamine-urea-formaldehyde condensate by adjusting the pH of the reaction medium to about 6.5–9.0; and
(d) stabilizing the aqueous sulfonated melamine-urea-formaldehyde condensate solution formed in step (c) by heating the reaction mixture obtained in step (c) to a temperature of from about 70° to about 100° C. for a period of from about 30 to about 180 minutes.

9. A stable aqueous sulfonated melamine-formaldehyde condensate solution according to claim 8 wherein the condensation of melamine and urea with formaldehyde in step (a) is carried out for a period of from about 15 to about 30 minutes after the reactants have been mixed and the reaction medium has become clear; wherein said sulfonating agent is an alkali metal sulfite or bisulfite, and wherein the sulfonation reaction is carried out for a period of from about 30 to about 180 minutes.

10. A stable aqeous sulfonated melamine-formaldehyde condensate solution according to claim 9 wherein said condensing step (c) is stopped by adjusting the pH of the reaction medium with a calcium-containing hydroxide or oxide which causes the precipitation of any sulfate ions present in said reaction medium.

11. A stable aqeous sulfonated melamine-urea-formaldehyde condensate solution according to claim 8 wherein the initial condensation step (a) is carried out at a pH of from about 10.5 to about 11.5 for a period of from about 15 to about 30 minutes after the reactants have been mixed and the reaction medium has become clear; and wherein sodium metabisulfite is used as the sulfonation agent in sulfonation step (b).

12. A stable aqeous sulfonated melamine-urea-formaldehyde condensate solution according to claim 11 wherein the sulfonation step (b) is carried out at a temperature of from about 75°–85° C. for about 45–75 minutes; wherein the condensation step (c) is carried out at a pH of from about 3.0–3.5 and at a temperature of from about 45°–55° C. for about 10 to 20 minutes before the pH is adjusted to a pH of from about 7.0–8.0; wherein the stabilization step (d) is carried out at a temperature of from 80°–100° C. for about 60–120 minutes; and wherein the clear solution obtained in step (d) is filtered while hot to remove all solids, cooled to ambient temperature and diluted with water to a predetermined solid content.

13. A stable aqeous sulfonated melamine-urea-formaldehyde condensate solution according to claim 12 wherein the pH of the diluted solution is adjusted to about 8.0–11.0.

* * * * *

UNITED STATES PATENT AND TRADEMARK OFFICE
CERTIFICATE OF CORRECTION

PATENT NO. : 4,820,766

DATED : April 11, 1989

INVENTOR(S) : Shawqui Lahalih; Ma'mun Absi-Halabi

It is certified that error appears in the above-identified patent and that said Letters Patent is hereby corrected as shown below:

On the title page:

[73]   Assignee:   Kuwait Institute for Scientific Research, Safat, Kuwait

Signed and Sealed this

Twentieth Day of November, 1990

Attest:

HARRY F. MANBECK, JR.

Attesting Officer

Commissioner of Patents and Trademarks